United States Patent
Dawson et al.

(10) Patent No.: US 9,300,547 B2
(45) Date of Patent: Mar. 29, 2016

(54) MODIFICATION OF CLOUD APPLICATION SERVICE LEVELS BASED UPON DOCUMENT CONSUMPTION

(71) Applicant: International Business Machines Corporation, Armonk, NY (US)

(72) Inventors: Christopher J. Dawson, Arlington, VA (US); Rick A. Hamilton, II, Charlottesville, VA (US); Kerrie L. Holley, Montara, CA (US); Ram Viswanathan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 14/083,587

(22) Filed: Nov. 19, 2013

(65) Prior Publication Data
US 2015/0142786 A1 May 21, 2015

(51) Int. Cl.
G06F 17/30 (2006.01)
H04L 12/24 (2006.01)
H04L 29/08 (2006.01)

(52) U.S. Cl.
CPC ...... *H04L 41/5003* (2013.01); *G06F 17/30011* (2013.01); *H04L 67/10* (2013.01)

(58) Field of Classification Search
None
See application file for complete search history.

(56) References Cited

U.S. PATENT DOCUMENTS

| | | |
|---|---|---|
| 2010/0050172 A1 | 2/2010 | Ferris |
| 2011/0173626 A1 | 7/2011 | Chi et al. |
| 2013/0132561 A1* | 5/2013 | Pasala ............... H04L 67/1097 709/224 |
| 2014/0337510 A1* | 11/2014 | Gesmann ............ H04L 41/5009 709/224 |
| 2014/0372347 A1* | 12/2014 | Cohen ................ G06F 11/0709 706/12 |

OTHER PUBLICATIONS

Author: Cohen et al.; Title: "Methods and Systems for Identifying Action for Responding to Anomaly in Cloud Computing System"; Date: Apr. 18, 2013; Publisher: PCT; Edition: WO2013055311 A1; Pertinent Pages: whole document (44 pages).*

Araujo, et al., "Hybrid Cloud Integration and Monitoring with IBM WebSphere Cast Iron", IBM® WebSphere®, IBM Redbooks, First Edition, International Technical Support Organization, SG24-8016-00, pp. 1-222, © Copyright IBM Corp., Dec. 2012.

Kailasam, et al., "Optimizing Service Level Agreements for Autonomic Cloud Bursting Schedulers", 2010 39th International Conference on Parallel Processing Workshops (ICPPW), Sep. 13-16, 2010, pp. 285-294, © 2010 IEEE, DOI 10.1109/ICPPW.2010.54.

IBM, "Method of creating a componentized architecture for unifying resource sharing scenarios in Cloud Computing environment", An IP.com Prior Art Database Technical Disclosure, Authors et. al.: IBM, Original Publication Date: Feb. 11, 2010, IP.com No. IPCOM000193146D, IP.com Electronic Publication: Feb. 11, 2010, pp. 1-14, <http:ip.com/IPCOM/000193146>.

* cited by examiner

*Primary Examiner* — Anh Tai Tran
(74) *Attorney, Agent, or Firm* — Edward P. Li

(57) ABSTRACT

An approach for modifying cloud application service levels based upon analysis of documents is provided. The approach performs automated ingestion of documents to determine criticality and needs of certain applications, and develops an understanding of existing cloud environments and service level agreements. The approach may further suggest or automatically reassign applications to the cloud infrastructure to meet the needs of an application.

18 Claims, 3 Drawing Sheets

MODIFICATION OF CLOUD APPLICATION SERVICE LEVELS BASED UPON DOCUMENT CONSUMPTION

TECHNICAL FIELD OF THE INVENTION

The present invention relates generally to cloud computing, and more particularly to automatically determining proper service levels and/or hardware requirements for cloud applications.

BACKGROUND

Today, cloud service levels associated with cloud workloads and the placement of applications onto cloud environments are often manually created and determined. A human decision may be made as to the criticality of a workload, human inspection and determination of possible cloud infrastructures are accomplished, and human direction is necessary to direct workloads to the appropriate infrastructure. Due to increases in analytics capabilities and complexity of organizational IT systems, needs may arise to automate such decisions, inspections, determinations, and directions. The automation may reduce human error possibilities and optimizes the overall infrastructure according to application needs.

SUMMARY

An approach for modifying cloud application service levels based upon analysis of documents is provided. The approach performs automated ingestion of documents to determine criticality and needs of certain applications, and develops an understanding of existing cloud environments and service level agreements. The approach may further suggest or automatically reassign applications to the cloud infrastructure to meet the needs of an application.

In one aspect, a computer-implemented method for modifying cloud application service levels based upon analysis of documents is provided. The computer-implemented method comprises receiving a list of cloud services available on a cloud infrastructure, receiving a list of keywords for analysis of corporate documents, receiving a list of Service Level Agreement (SLA) metrics generated from SLA documents of the corporate documents, calculating, based on parameters related to the keywords found in the corporate documents and the SLA metrics found in the SLA documents, scores of the cloud services so as to identify one or more problems of the cloud services, retrieving from a repository a list of dispatching techniques for mitigating the one or more problems, and prioritizing based on the scores the dispatching techniques.

In another aspect, a computer program product for modifying cloud application service levels based upon analysis of documents is provided. The computer program product comprises a computer readable storage medium having program code embodied therewith. The program code is executable to receive a list of cloud services available on a cloud infrastructure, receive a list of keywords for the analysis of corporate documents, receive a list of Service Level Agreement (SLA) metrics generated from SLA documents of the corporate documents, calculate, based on parameters related to the keywords found in the corporate documents and the SLA metrics found in the SLA documents, scores of the cloud services so as to identify one or more problems of the cloud services, retrieve from a repository a list of dispatching techniques for mitigating the one or more problems, and prioritize based on the scores the dispatching techniques.

In yet another aspect, a computer system for modifying cloud application service levels based upon analysis of documents is provided. The computer system comprises one or more processors, one or more computer-readable tangible storage devices, and program instructions stored on at least one of the one or more computer-readable tangible storage devices for execution by at least one of the one or more processors. The program instructions are executable to receive a list of cloud services available on a cloud infrastructure, receive a list of keywords for the analysis of corporate documents, receive a list of Service Level Agreement (SLA) metrics generated from SLA documents of the corporate documents, calculate, based on parameters related to the keywords found in the corporate documents and the SLA metrics found in the SLA documents, scores of the cloud services so as to identify one or more problems of the cloud services, retrieve from a repository a list of dispatching techniques for mitigating the one or more problems, and prioritize based on the scores the dispatching techniques.

DETAILED DESCRIPTION

An approach disclosed in embodiments of the present invention performs automated ingestion of documents to determine criticality and needs of certain applications. The approach develops an understanding of existing cloud environments and service level agreements which may be obtained by each including any modifications to hardware sizing. The approach suggests or automatically reassigns applications to the cloud infrastructure to meet the needs of the application. Furthermore, feedback loops may be incorporated to better understand the impact of certain changes to the overall attainment of organizational goals. In the embodiments of the present invention, the injection of documents uses both human and machine readable parts. For example, a legal document for the service level agreement may have both a human readable form and a machine readable section. This machine readable section is scanned during the ingestion to reflect the legal service levels included in the document.

The approach disclosed in embodiments of the present invention allows for automated determination of the appropriate cloud infrastructure and modification of the infrastructure to meet the application's needs. Thus, the approach disclosed in embodiments of the present invention allows for better determination of the optimal cloud environment for a given application and better modification of existing cloud environments to meet a body of applications' needs.

Figure 1:
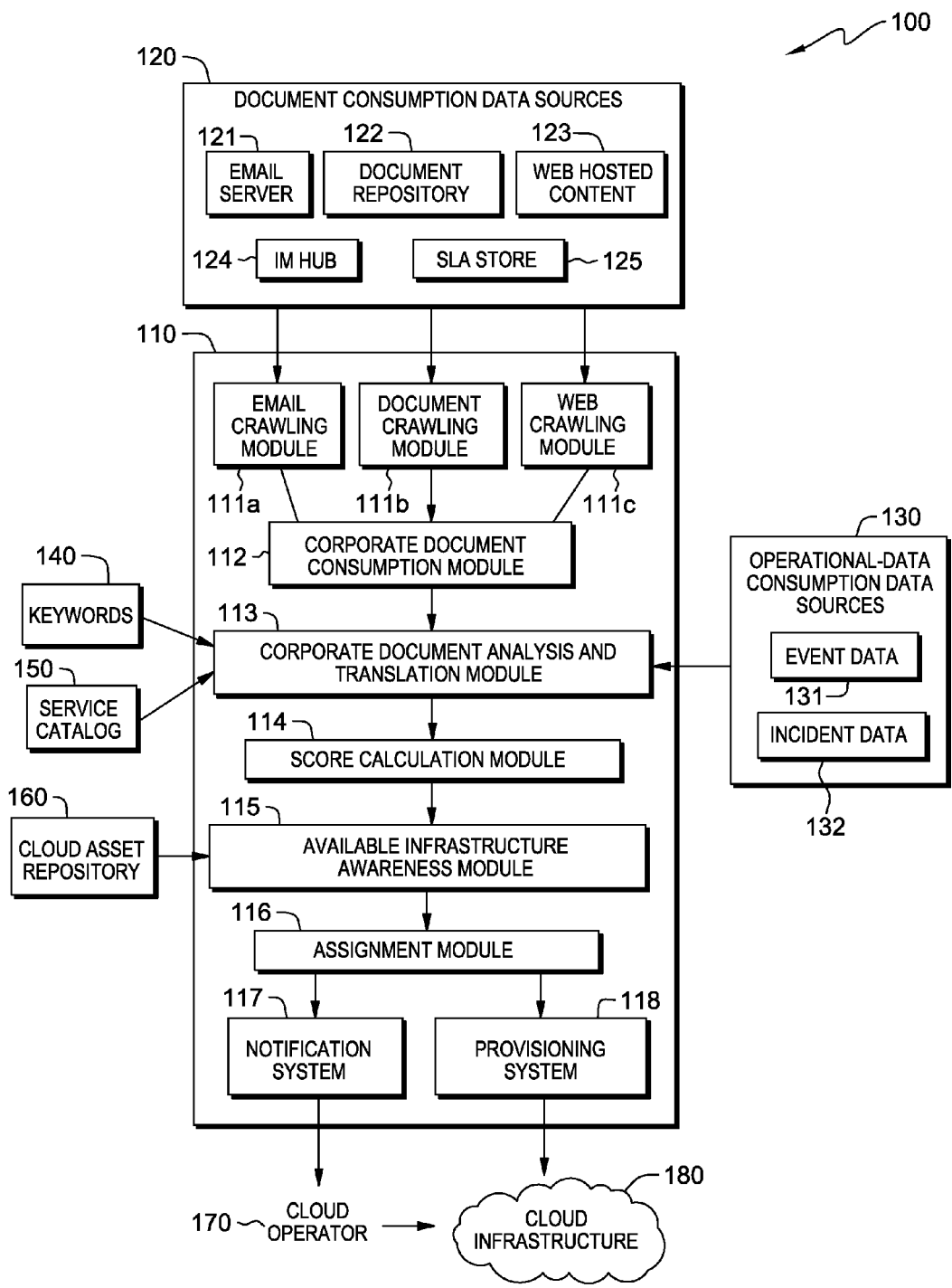
FIG. 1 is a diagram illustrating components of a system for modifying cloud application service levels via document consumption, in accordance with one embodiment of the present invention.

FIG. 1 is a diagram illustrating components of system 100 for modifying cloud application service levels via document consumption (or document analysis), in one embodiment of the present invention. System 100 includes functional modules 110 which comprise three major groups of modules: modules for automatically ingesting documents, modules for developing an understanding of an existing cloud environment, and modules for suggesting or automatically assigning applications to the optimal cloud infrastructure. In the exemplary embodiment shown in FIG. 1, the modules for automatically ingesting documents include email crawling module 111a, document crawling module 111b, web crawling module 111c, corporate document consumption module 112, and corporate document analysis and translation module 113; the modules for developing an understanding of an existing cloud environment include score calculation module 114 and available infrastructure awareness module 115; modules for suggesting or automatically assigning applications to the optimal cloud infrastructure include assignment module 116, notification system 117, and provisioning system 118.

System 100 further includes document consumption data sources 120 and operational-data consumption data sources 130. Document consumption data sources 120 comprise, for example, email server 121, document repository 122, web hosted content 123, IM (Instant Messaging) hub 124, and SLA (Service Level Agreement) store 125. Operational-data consumption data sources 130 comprise, for example, event data 131 and incident data 132.

Referring to FIG. 1, email crawling module 111a, document crawling module 111b, and web crawling module 111c retrieve documents from document consumption data sources 120. Data from document consumption data sources 120 is retrieved from a set of systems, for example email server 121, IM hub 124, document repository 122, SLA store 125, and web hosted content 123. For example, web crawling module 111c starts with a predefined set of URLs (Uniform Resource Locators) such as a company intranet page and/or a site map. Email crawling module 111a, document crawling module 111b, and web crawling module 111c use a known spider method to follow various links and threads. Email crawling module 111a, document crawling module 111b, and web crawling module 111c retrieve a large amount of the data. The documents retrieved by email crawling module 111a, document crawling module 111b, and web crawling module 111c are passed to corporate document consumption module 112 and then other downstream modules.

Referring to FIG. 1, corporate document consumption module 112 acquires corporate documents for analysis. In one embodiment, web crawling module 111c is used to fetch documents from a corporate intranet. In another embodiment, a consultant selects a subset of documents for consumption and provides them to the consumption module through a computerized, potentially web enabled, document repository interface. In yet another embodiment, corporate email documents are provided to this module for consumption; preferably, a specialized program connects to the corporate email server and extracts relevant historical correspondence. If the email server does not support historical document retention, a program is installed atop the email server to record correspondence for future analysis. The email documents may be automatically limited to only including those in senior or upper management; the limitation may yield better results for document consumption (document analysis).

Referring to FIG. 1, corporate document analysis and translation module 113 translates contents of the acquired documents into cloud infrastructure requirements for a given business application or set of applications. Corporate document analysis and translation module 113 also analyzes for a set of keywords and keyword counts. The keywords are fed into known rule-based engines to ascertain service level needs. Additionally, text analytics engines, such as IBM's COBRA (COrporate Brand and Reputation Analysis), may be used to discern trends across disparate documents. The acquired documents are analyzed for keywords, references to the cloud services, and other text that can be used to ascertain potential SLA and performance failures. Corporate document analysis and translation module 113 maps the contents of the acquired documents against a list of services that the cloud infrastructure is providing and cross-references against the keywords. Corporate document analysis and translation module 113 provides a list of "hits" where some of the contents are matched to one of cloud services with a specific issue (for example, performance, availability, or slowness, etc.) from the keywords.

Referring to FIG. 1, corporate document analysis and translation module 113 retrieves information of the cloud services from service catalog 150, and receives the keywords either manually or automatically from keywords 140. Corporate document analysis and translation module 113 also retrieves data from operational-data consumption data sources 130. Operational-data consumption data sources 130 include incident data 132 where incident tickets are stored and event data 131 which stores monitoring data of the cloud infrastructure. In other embodiments, operational-data consumption data sources 130 can be acquired by a crawling module.

Referring to FIG. 1, score calculation module 114 calculates scores for the cloud services. The scores are calculated according to the keywords and/or SLA metrics. The SLA metrics may include, but are not limited to, service availability, change management procedures, reliability, security, conformance to standards, e.g., SOX (Sarbanes-Oxley Act), service continuity, and financial charges.

Referring to FIG. 1, available infrastructure awareness module 115, by retrieving information from cloud asset repository 160, cross-references available resources in the cloud and resolution steps (for example, increasing memory, procuring a new asset, etc.) and identifies a list of potential actions to perform. Available infrastructure awareness module 115 develops and maintains awareness of the available cloud infrastructures and service levels which may be achieved. The information on cloud asset repository 160 can be obtained via use of look-up tables with periodic refresh. The information on cloud asset repository 160 can be developed by use of a pub-sub system, wherein cloud providers periodically provide updates to the list of available infrastructure. The awareness information can be maintained locally on cloud asset repository 160, or pulled from remote sources at times when the need to assess new infrastructures becomes apparent, based on the needs of applications.

Referring to FIG. 1, assignment module 116 either automatically performs the resolution steps or notifies cloud operator 170 as to a set of steps that may be performed on cloud infrastructure 180. Assignment module 116 automatically performs the resolution steps on cloud infrastructure 180 through provisioning system 118.

Figure 2:
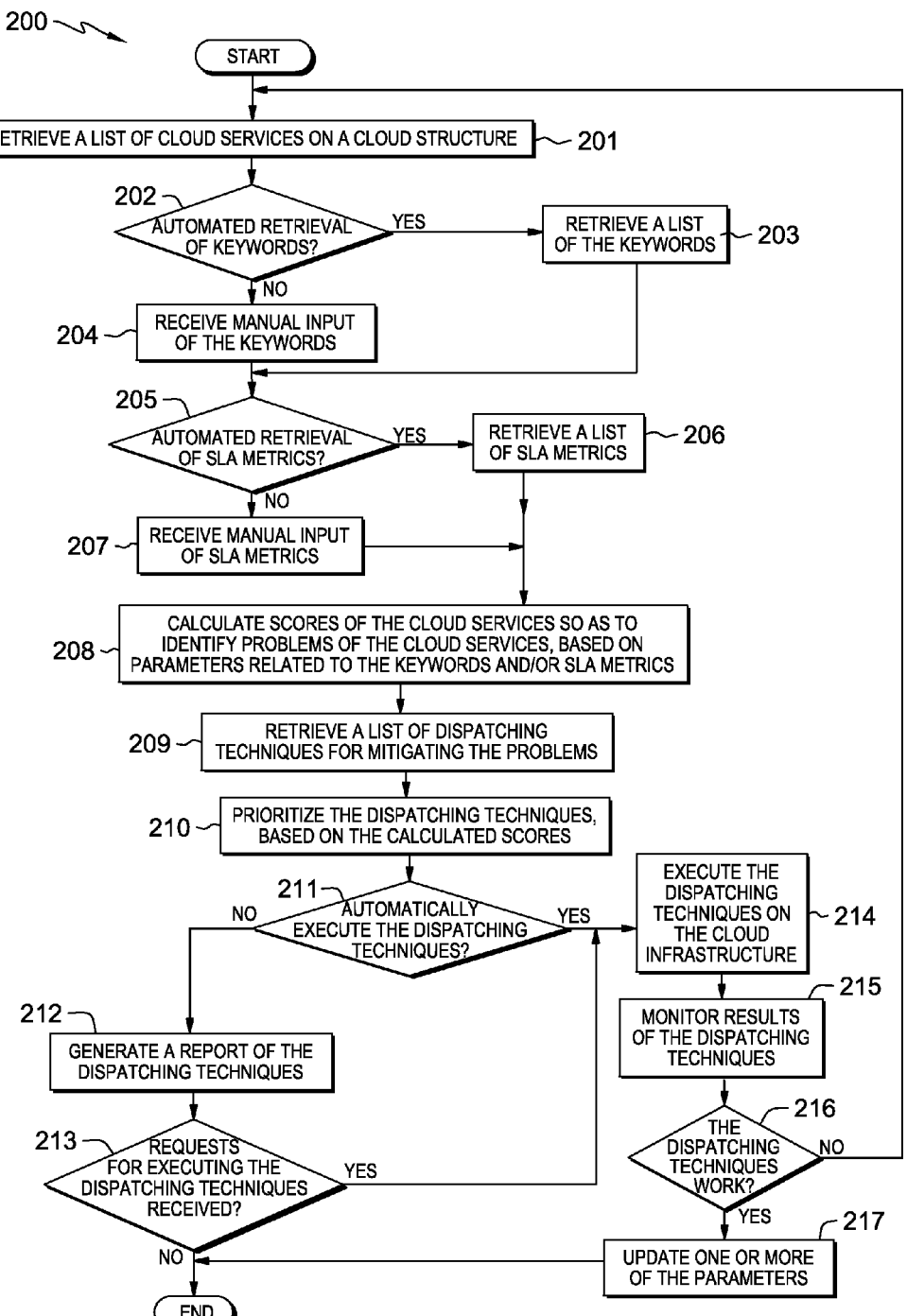
FIG. 2 is a flowchart illustrating operating steps of modifying cloud application service levels via document consumption, in accordance with one embodiment of the present invention.

FIG. 2 is flowchart 200 illustrating operating steps of modifying cloud application service levels via document consumption, in one embodiment of the present invention. The operational steps are implemented by one or more computer programs, more particularly by functional modules 110 shown in FIG. 1.

Referring to FIG. 2, at step 201, functional modules 110 retrieve a list of cloud services, which are to be analyzed, on a cloud infrastructure. This information is retrieved from service catalog 150 (shown in FIG. 1). In other embodiments, this information may be retrieved from a list of business services or other measurable attributes which users wish to measure effectiveness and efficiency. For example, the list of cloud services is shown in Table 1.

TABLE 1

| Cloud Service Name | Runs On |
|---|---|
| Managed Storage Service | Private Cloud |
| Credit Card Processing | Unix Dedicated |
| Windows Servers | Public Cloud |

At decision block 202, functional modules 110 determine whether automated retrieval of keywords is to be processed. In response to determining that the automated retrieval of the keywords is not to be processed ("NO" branch of decision block 202), functional modules 110 at step 204 receive from a user a list of the keywords that are manually created. In response to determining that the automated retrieval of the keywords is to be processed ("YES" branch of decision block 202), functional modules 110 at step 203 retrieve a list of the keywords that is automatically created. The lists that are manually and automatically created are built based on search keywords, metadata tags, or frequently found words. For document ingestion, the list will be used to match the keywords in both structured and unstructured data. For example, the keywords include "network connection is slow", "can't connect to my email", "mission critical", "confidential", "batch processing", "low priority", "Sarbanes-Oxley", "number of users", "response time", and etc. Values are assigned to the keywords, either in a binary state (True or False) or in gradients.

At decision block 205, functional modules 110 determine whether automated retrieval of SLA (Service Level Agreement) metrics is to be processed. In response to determining that the automated retrieval of the SLA metrics is not to be processed ("NO" branch of decision block 205), functional modules 110 at step 207 receive from the user a list of SLA metrics that is manually created. In response to determining that the automated retrieval of the SLA metrics is to be processed ("YES" branch of decision block 205), functional modules 110 at step 206 retrieve a list of the SLA metrics that is automatically created. The SLA metrics are generated from SLA documents. For example, in the automated retrieval of the SLA metrics, attached metadata is fed into a document ingestion system, SLA metrics, such as availability, responsiveness, and performance, are captured.

At step 208, functional modules 110 calculate scores of the cloud services so as to identify one or more problems or issues of the cloud services. The calculation of the scores is based on parameters related to the keywords and/or SLA metrics. For example, in calculation of the scores, functional modules 110 use parameters such as weight, frequency, and a field of "used before?". The weight is the importance of a specific keyword or one of SLA metrics; for example, availability in the context of a business application may be more important than email. The frequency is the number of times that the specific keyword has been found. The "used before?" field is used to determine if a match between a specific keyword or the one of the SLA metrics and a cloud service has been found before the current cycle of analysis and has been proven to have been useful in the past. The "used before?" field is an indication that the one of SLA metrics in question is a useful attribute. For example, the scores can be calculated by a simple algorithm using the weight, frequency, and the "used before?" field, as follows:

score=(weight+used before)*frequency

An illustrative example of the scores calculated is shown in Table 2. In the example shown in Table 2, the cloud service with the highest score is credit card processing. In addition to these fields, cost, effort, duration, and risk may all be included in the calculation of the scores.

TABLE 2

| Service Name | Keywords | Used Before | Weight | Frequency | Score |
|---|---|---|---|---|---|
| Managed Storage Service | "Network connection is slow for my managed storage service" | 1 | 5 | 3 | 18 |
| Managed Storage Service | "Can't connect to my storage service" | 0 | 10 | 2 | 20 |
| Credit Card Processing | "I am having problems with processing my credit card" | 0 | 10 | 5 | 50 |
| Windows Server | "SLA template shows an availability of 99% is required" | 1 | 5 | 2 | 12 |

At step 209, functional modules 110 retrieve, from a repository such as cloud asset repository 160 shown in FIG. 1, a list of dispatching techniques. The dispatching techniques are potential actions which can be performed on the cloud infrastructure to mitigate one or more problems or issues. An example of the list of the dispatching techniques is shown in Table 3.

TABLE 3

| Dispatching Techniques | Used On |
|---|---|
| Provision Extra Cloud Resource | Private Cloud, Public Cloud |
| Increase Memory | Unix Dedicated |
| Migrate to Faster VM | Public Cloud |

At step 210, functional modules 110 prioritize the dispatching techniques, based on the score calculated at step 208. By mapping the cloud services and the dispatch techniques, prioritization of the dispatching techniques can be made, as shown in Table 4. In the example shown in Table 4, functional modules 110 determine that the prioritization of the dispatching techniques is in a sequence: increase memory of the credit card processing system, migrate the managed storage service to faster VM, and provision extra cloud resources.

TABLE 4

| Service Name | Runs On | Score | Dispatching Techniques |
|---|---|---|---|
| Managed Storage Service | Private Cloud | 18 | Provision Extra Cloud Resource |
| Managed Storage Service | Private Cloud | 20 | Migrate to Faster VM |
| Credit Card Processing | Unix Dedicated | 50 | Increase Memory |
| Windows Server | Public Cloud | 12 | Provision Extra Cloud Resource |

The dispatching techniques may be either automatically or manually executed on the cloud infrastructure, depending on characteristics of the cloud infrastructure. At decision block 211, functional modules 110 determine whether the dispatching techniques are automatically executed on the cloud infrastructure. In response to determining that the dispatching techniques are not automatically executed ("NO" branch of decision block 211), functional modules 110 at step 212 generate a report of the dispatching techniques. In the report, functional modules 110 provide suggestions of the dispatching techniques to a human interface (e.g., cloud operator 170 shown in FIG. 1) or an external provisioning agent who makes a decision on execution of the dispatching techniques. At decision block 213, functional modules 110 determine whether requests for execution of the dispatching techniques are received from the human interface. In response to determining that the requests for execution of the dispatching techniques are not received ("NO" branch of decision block 213) functional modules 110 terminate.

In response to determining that the dispatching techniques are automatically executed ("YES" branch of decision block 211), or in response to determining that the requests for execution of the dispatching techniques are received ("YES" branch of decision block 213), functional modules 110 execute the dispatching techniques on the cloud infrastructure at step 214. Next, functional modules 110, at step 215, monitor results of the dispatching techniques on the cloud infrastructure.

At decision block 216, functional modules 110 determine whether the dispatching techniques work or mitigate the one or more problems or issues. In response to determining that the dispatching techniques do not work or do not mitigate the one or more problems or issues ("NO" branch of decision block 216), functional modules 110 run again the logic flow in flowchart 200, as shown by the loop in FIG. 2. In response to determining that the dispatching techniques work or mitigate the one or more problems or issues ("YES" branch of decision block 216), functional modules 110 at step 217 update one or more of the parameters. In the exemplary embodiment, the field of "used before?" is updated, and the "used before" count is increased.

Figure 3:
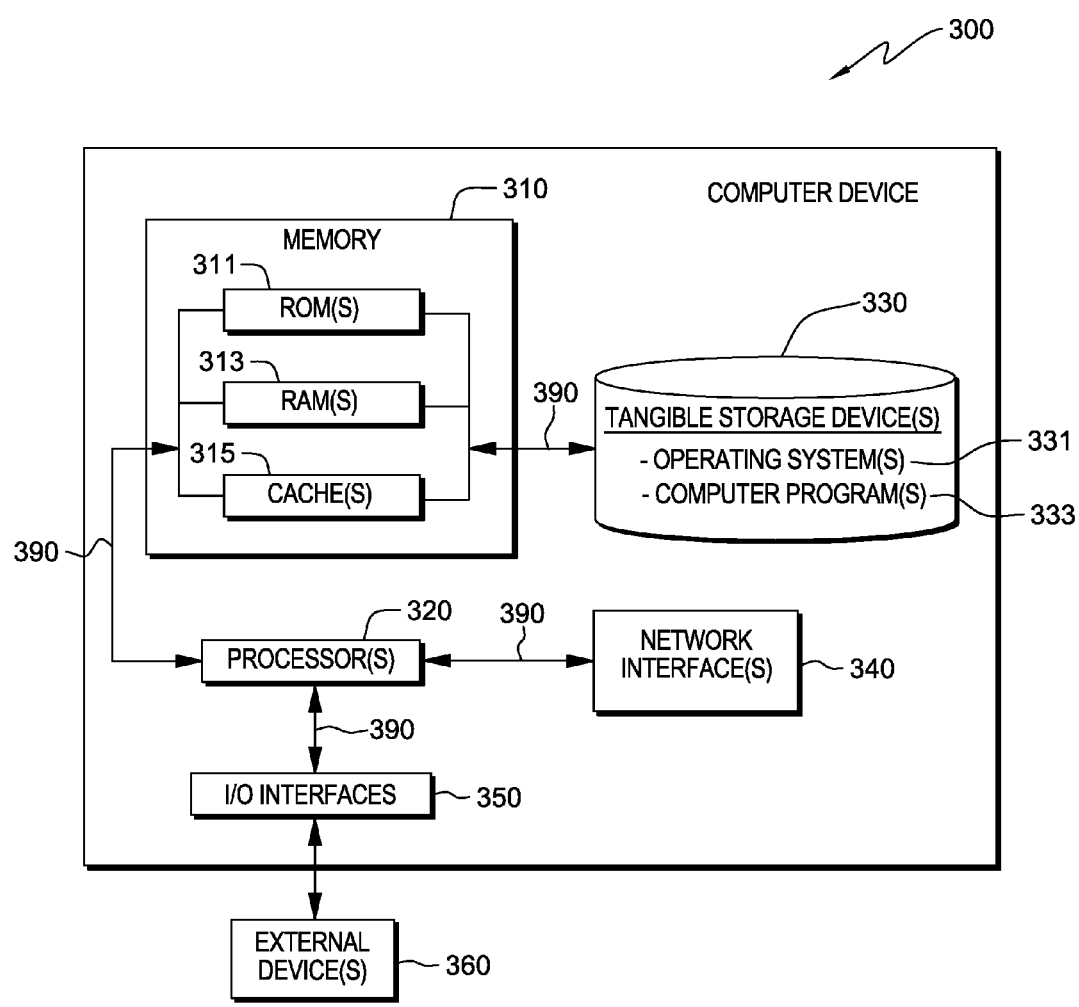
FIG. 3 is a diagram illustrating components of a computer system hosting the system (shown in FIG. 1) for modifying cloud application service levels via document consumption, in accordance with one embodiment of the present invention.

FIG. 3 is a diagram illustrating components of computer system 300 hosting the system (shown in FIG. 1) for modifying cloud application service levels via document consumption, in one embodiment of the present invention. It should be appreciated that FIG. 3 provides only an illustration of one implementation and does not imply any limitations with regard to the environment in which different embodiments may be implemented. In other embodiments, functional modules 110 may reside respectively on multiple computer devices.

Referring to FIG. 3, computer system 300 includes processor(s) 320, memory 310, tangible storage device(s) 330, network interface(s) 340, and I/O (input/output) interface(s) 350. In FIG. 3, communications among the above-mentioned components of computer system 300 are denoted by numeral 390. Memory 310 includes ROM(s) (Read Only Memory) 311, RAM(s) (Random Access Memory) 313, and cache(s) 315.

One or more operating systems 331 and one or more computer programs 333 reside on one or more computer-readable tangible storage device(s) 330. In the exemplary embodiment, functional modules 110 reside on at least one of one or more computer-readable tangible storage device(s) 330.

Computer system 300 further includes I/O interface(s) 350. I/O interface(s) 350 allow for input and output of data with external device(s) 360 that may be connected to computer system 300. Computer system 300 further includes network interface(s) 340 for communications between computer system 300 and a computer network.

In another embodiment, the invention provides a method that performs the process of the invention on a subscription, advertising, and/or fee basis. That is, a service provider, such as a Solution Integrator, could offer to provide functionality for modifying cloud application service levels via document consumption. In this case, the service provider can create, maintain, support, etc., a computer infrastructure, such as computer system 300 (shown in FIG. 3) that performs the processes of the invention for one or more consumers. In return, the service provider can receive payment from the consumer(s) under a subscription and/or fee agreement and/or the service provider can receive payment from the sale of advertising content to one or more third parties.

In yet another embodiment, the invention provides a computer-implemented method for assessing a service offering selected by a user in a networked computing environment. In this case, a computer infrastructure, such as computer system 300 (shown in FIG. 3), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 300 (shown in FIG. 3), from a computer-readable medium; (2) adding one or more computing devices to the computer infrastructure; and (3) incorporating and/or modifying one or more existing systems of the computer infrastructure to enable the computer infrastructure to perform the processes of the invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The term of "computer readable storage medium" or "one or more computer-readable tangible storage devices", as used in this document, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like, and conventional procedural programming languages, such as the "C" programming language, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture, including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for modifying cloud application service levels based upon analysis of documents, the computer-implemented method comprising:
    receiving a list of cloud services available on a cloud infrastructure;
    receiving a list of keywords for analysis of corporate documents;
    receiving a list of Service Level Agreement (SLA) metrics generated from SLA documents of the corporate documents;
    calculating scores of the cloud services, based on parameters, weights, and frequencies, wherein the parameters are related to the keywords found in the corporate documents and the SLA metrics found in the SLA documents, wherein the weights are related to importance of the keywords and the SLA metrics, wherein the frequencies are numbers of times that the keywords are found in the corporate documents;
    identifying one or more problems of the cloud services;
    retrieving, from a repository, a list of dispatching techniques for mitigating the one or more problems;
    prioritizing the dispatching techniques, based on the scores;
    determining whether the dispatching techniques are automatically executed on the cloud infrastructure; and
    generating a report that provides suggestions of the dispatching techniques to a user, in response to determining that the dispatching techniques are not automatically executed on the cloud infrastructure.

2. The computer-implemented method of claim 1, further comprising:
    executing the dispatching techniques on the cloud infrastructure; and
    monitoring whether the dispatching techniques mitigate the one or more problems.

3. The computer-implemented method of claim 1, further comprising:
    receiving from the user a request for executing the dispatching techniques;
    executing the dispatching techniques on the cloud infrastructure; and
    monitoring whether the dispatching techniques mitigate the one or more problems.

4. The computer-implemented method of claim 1, wherein the user is a cloud operator or an external provisioning agent.

5. The computer-implemented method of claim 1, further comprising:
    updating one or more of the parameters for calculating the scores, in response to determining that the dispatching techniques mitigate the one or more problems.

6. The computer-implemented method of claim 1, wherein the documents include at least one of: corporate email documents, corporate documents on a document repository, web hosted corporate content, information on a corporate Instant Messaging (IM) hub, and the SLA documents.

7. A computer program product for modifying cloud application service levels based upon analysis of documents, the computer program product comprising a computer readable storage medium having program code embodied therewith, the program code executable to:
    receive a list of cloud services available on a cloud infrastructure;
    receive a list of keywords for the analysis of corporate documents;

receive a list of Service Level Agreement (SLA) metrics generated from SLA documents of the corporate documents;

calculate scores of the cloud services, based on parameters, weights, and frequencies, wherein the parameters are related to the keywords found in the corporate documents and the SLA metrics found in the SLA documents, wherein the weights are related to importance of the keywords and the SLA metrics, wherein the frequencies are numbers of times that the keywords are found in the corporate documents;

identify one or more problems of the cloud services;

retrieve, from a repository, a list of dispatching techniques for mitigating the one or more problems;

prioritize the dispatching techniques, based on the scores;

determine whether the dispatching techniques are automatically executed on the cloud infrastructure; and generate a report that provides suggestions of the dispatching techniques to a user, in response to determining that the dispatching techniques are not automatically executed on the cloud infrastructure.

8. The computer program product of claim 7, further comprising the program code executable to:

execute the dispatching techniques on the cloud infrastructure; and monitor whether the dispatching techniques mitigate the one or more problems.

9. The computer program product of claim 7, further comprising the program code executable to:

receive from the user a request for executing the dispatching techniques;

execute the dispatching techniques on the cloud infrastructure; and monitor whether the dispatching techniques mitigate the one or more problems.

10. The computer program product of claim 7, wherein the user is a cloud operator or an external provisioning agent.

11. The computer program product of claim 7, further comprising the program code executable to:

update one or more of the parameters for calculating the scores, in response to determining that the dispatching techniques mitigate the one or more problems.

12. The computer program product of claim 7, wherein the documents include at least one of: corporate email documents, corporate documents on a document repository, web hosted corporate content, information on a corporate Instant Messaging (IM) hub, and the SLA documents.

13. A computer system for modifying cloud application service levels based upon analysis of documents, the computer system comprising:

one or more processors, one or more computer-readable tangible storage devices, and program instructions stored on at least one of the one or more computer-readable tangible storage devices for execution by at least one of the one or more processors, the program instructions executable to:

receive a list of cloud services available on a cloud infrastructure;

receive a list of keywords for the analysis of corporate documents;

receive a list of Service Level Agreement (SLA) metrics generated from SLA documents of the corporate documents;

calculate scores of the cloud services, based on parameters, weights, and frequencies, wherein the parameters are related to the keywords found in the corporate documents and the SLA metrics found in the SLA documents, wherein the weights are related to importance of the keywords and the SLA metrics, wherein the frequencies are numbers of times that the keywords are found in the corporate documents;

identify one or more problems of the cloud services;

retrieve, from a repository, a list of dispatching techniques for mitigating the one or more problems;

prioritize the dispatching techniques, based on the scores;

determine whether the dispatching techniques are automatically executed on the cloud infrastructure; and generate a report that provides suggestions of the dispatching techniques to a user, in response to determining that the dispatching techniques are not automatically executed on the cloud infrastructure.

14. The computer system of claim 13, further comprising the program instructions executable to:

execute the dispatching techniques on the cloud infrastructure; and monitor whether the dispatching techniques mitigate the one or more problems.

15. The computer system of claim 13, further comprising the program instructions executable to:

receive from the user a request for executing the dispatching techniques;

execute the dispatching techniques on the cloud infrastructure; and monitor whether the dispatching techniques mitigate the one or more problems.

16. The computer system of claim 13, wherein the user is a cloud operator or an external provisioning agent.

17. The computer system of claim 13, further comprising the program instructions executable to:

update one or more of the parameters for calculating the scores, in response to determining that the dispatching techniques mitigate the one or more problems.

18. The computer system of claim 13, wherein the documents include at least one of: corporate email documents, corporate documents on a document repository, web hosted corporate content, information on a corporate Instant Messaging (IM) hub, and the SLA documents.

* * * * *